United States Patent
Park et al.

(10) Patent No.: US 8,343,651 B2
(45) Date of Patent: Jan. 1, 2013

(54) BATTERY PACK

(75) Inventors: Kyung-Ho Park, Yongin-si (KR); Seok Koh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 13/010,758

(22) Filed: Jan. 20, 2011

(65) Prior Publication Data

US 2012/0015216 A1 Jan. 19, 2012

Related U.S. Application Data

(60) Provisional application No. 61/365,254, filed on Jul. 16, 2010.

(51) Int. Cl.
*H01M 6/42* (2006.01)

(52) U.S. Cl. ........ 429/151; 429/100; 429/138; 429/159; 429/153; 429/163; 429/167; 429/176

(58) Field of Classification Search .................. 429/123, 429/138, 143, 149–163, 167, 175–178, 186, 429/99–100
See application file for complete search history.

(56) References Cited

U.S. PATENT DOCUMENTS

| | | |
|---|---|---|
| 2005/0202315 A1 | 9/2005 | Sugeno et al. |
| 2005/0208375 A1 | 9/2005 | Sakurai |
| 2006/0024573 A1 * | 2/2006 | Yim et al. ...................... 429/174 |
| 2007/0111087 A1 * | 5/2007 | Tsai ............................... 429/100 |
| 2009/0087692 A1 | 4/2009 | Park et al. |
| 2009/0092891 A1 | 4/2009 | Kwag et al. |
| 2009/0111018 A1 | 4/2009 | Park et al. |
| 2009/0317703 A1 * | 12/2009 | Kwag et al. ................... 429/159 |

FOREIGN PATENT DOCUMENTS

| | | |
|---|---|---|
| EP | 2 325 917 A1 | 5/2011 |
| JP | 2009-043462 | 2/2009 |
| JP | 2009-272234 | 11/2009 |
| KR | 10-2006-0027277 | 3/2006 |
| KR | 10-0876267 | 12/2008 |
| KR | 2009-0043917 | 5/2009 |

OTHER PUBLICATIONS

European Search Report dated Nov. 7, 2011, for corresponding European Patent application 11173465.3, 8 pages.

* cited by examiner

*Primary Examiner* — Patrick Joseph Ryan
*Assistant Examiner* — Ben Lewis
(74) *Attorney, Agent, or Firm* — Christie, Parker & Hale, LLP

(57) ABSTRACT

A battery pack includes a plurality of secondary batteries fixed in a frame to be enclosed by an outer frame. The battery pack includes at least first and second battery cells having an electrode terminal and a frame surrounding a periphery of the first and second battery cells. The frame has at least one opening corresponding to the electrode terminal of the first and second battery cells.

15 Claims, 11 Drawing Sheets

BATTERY PACK

CROSS-REFERENCE TO RELATED APPLICATION

This application claims priority to and the benefit of U.S. Provisional Application No. 61/365,254, filed on Jul. 16, 2010, in the United States Patent and Trademark Office, the entire content of which is incorporated herein in its entirety by reference.

BACKGROUND

1. Field

One or more embodiments of the present invention relate to a battery pack, particularly, a battery pack including a plurality of secondary batteries.

2. Description of Related Art

A demand for increasing capacity of secondary batteries is increasing in the market with the rapid development in the electronic, communication and computer industries.

In order to increase the capacity, it is possible to increase the size of the secondary batteries or include a plurality of secondary batteries in one pack. However, increasing the size of the secondary batteries may cause a problem in terms of safety. Therefore, various studies have been conducted to include a plurality of secondary batteries in one battery pack and improve performance of the battery pack.

SUMMARY

Aspects of embodiments according to the present invention are directed toward a battery pack that may be manufactured to have high capacity by including a plurality of secondary batteries in one battery pack.

Further, aspects of embodiments according to the present invention are directed toward a battery pack that can control current and voltage of a plurality of secondary batteries with one Protective Circuit Module (PCM). Therefore, it is possible to reduce the number of parts, such as a PCM assembly, thereby reducing the cost of production. Further, since the production method of the battery pack is simple, it is possible to improve the manufacturing efficiency of the battery pack.

Further, aspects of embodiments according to the present invention are directed toward a battery pack that can firmly couple a plurality of secondary batteries together using a PCM assembly. Therefore, the secondary batteries accommodated in the battery pack are less likely to be moved in the battery pack by an external shock, such as a drop of the battery pack, and are electrically stable.

Further, aspects of embodiments according to the present invention are directed toward a battery pack that includes a frame fixing a plurality of secondary batteries therein. The frame may be easily modified in accordance with the shape of the secondary batteries accommodated in the battery pack.

According to one embodiment, a battery pack includes at least first and second battery cells having an electrode terminal, and a frame surrounding a periphery of the first and second battery cells and having at least one opening corresponding to the electrode terminal of the first and second battery cells.

The frame may have at least one notch at a second side opposite to a first side having the at least one opening.

The battery pack may further include a protective circuit module (PCM) assembly electrically coupled to the battery cells by an electrode tab via the at least one notch.

The frame may include at least one flange extending along at least one inner side of at least one side of the frame.

The frame may further include a rib joining an inner surface thereof with a side of the at least one flange, the rib being shaped to conform to a surface of the first and second battery cells.

The battery pack may further include an adhesive member fixing the first and second battery cells together within the frame. The adhesive member may include a double-sided tape. The adhesive member may include a peripheral portion surrounding an opening.

The frame may include a step portion extending on an outside surface of at least a portion of at least one side of the frame.

The frame may have at least one notch at a second side opposite to a first side having the at least one opening, and the step portion may extend to the at least one notch at an outside surface of the second side.

The battery pack may further include a protective circuit module (PCM) assembly having at least a portion thereof on the step portion. The PCM assembly is electrically coupled to the battery cells by an electrode tab via the at least one notch.

The frame may further include at least one locking protrusion on an outside surface of the frame.

The battery pack may further include an outer frame receiving the frame and the first and second battery cells therein, the outer frame including at least one groove on an inner surface thereof for engaging the at least one locking protrusion of the frame.

The battery pack may further include a cover substantially enclosing the outer frame.

The frame may further include a guiding groove on an inner surface thereof, the guiding groove being located to correspond to an electrolyte injection hole of the first and second battery cells.

The battery pack may further include a sealing material sealing the electrolyte injection hole of the first and second battery cells.

The frame may be a single integral frame.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Embodiments of the present invention and other information for those skilled in the art to easily understand the present invention are described hereinafter in detail with the accompanying drawings. However, the present invention may be changed and modified in various ways within the scope described in the appended claims; therefore, it is not limited to exemplary embodiments described below.

The configuration and operation of exemplary embodiments according to the present invention are described hereinafter in more detail with reference to the accompanying drawings.

FIGS. 1 to 8 illustrate a battery pack according to an embodiment of the present invention.

Figure 1:
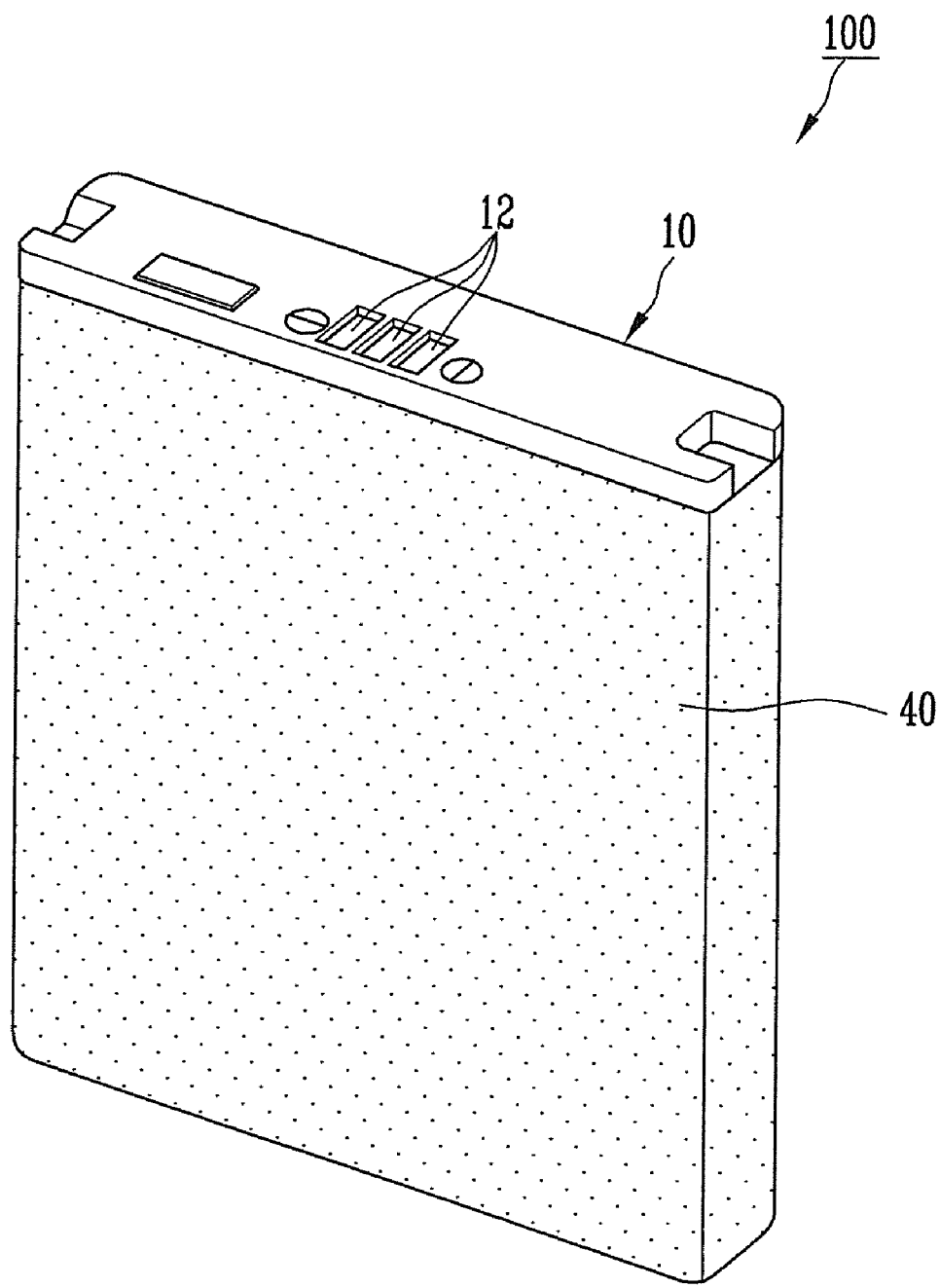
FIG. 1 is a perspective view of a battery pack according to an embodiment of the present invention.
Figure 2:
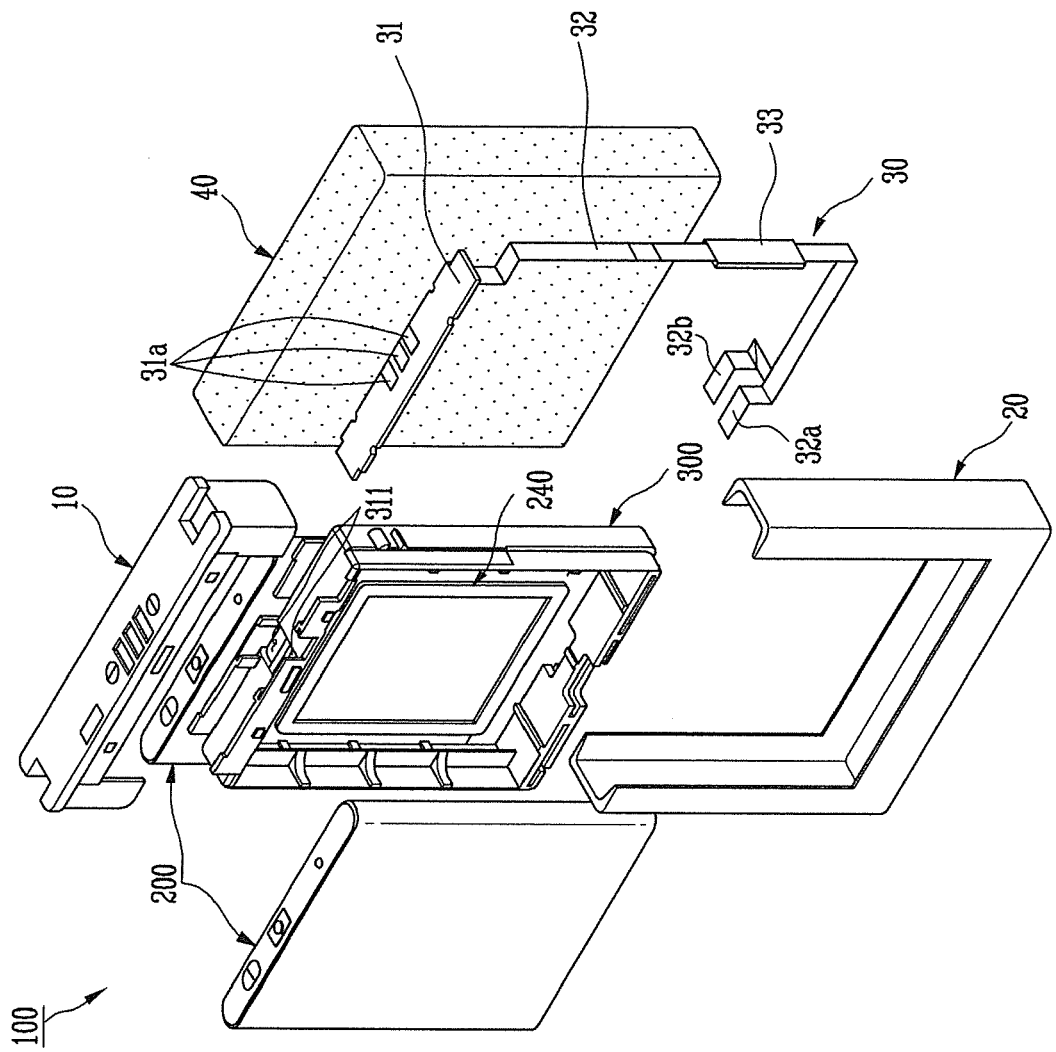
FIG. 2 is an exploded view of the battery pack shown in FIG. 1.
Figure 3:
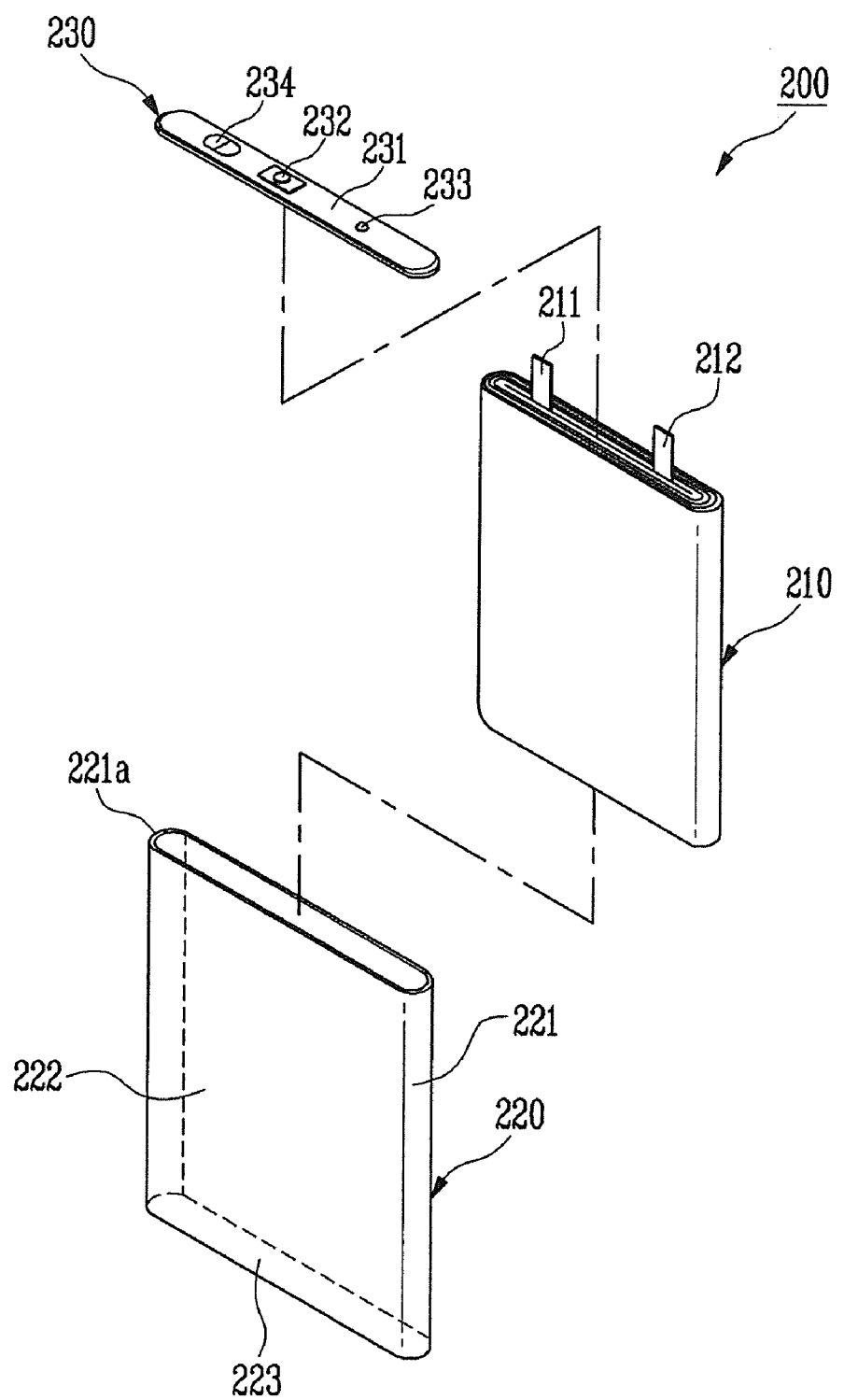
FIG. 3 is an exploded view of a secondary battery accommodated in the battery pack shown in FIG. 1.

FIG. 1 is a perspective view of a battery pack according to an embodiment of the present invention, and FIG. 2 is an exploded view of the battery pack of FIG. 1. FIG. 3 is an exploded view of a secondary battery according to one embodiment.

Referring to FIGS. 1 and 2, a battery pack 100 according to one embodiment includes: a plurality of secondary batteries 200 and a rectangular sub-frame 300 surrounding the sides or peripheries of the secondary batteries 200 and having an opening (e.g., notches) corresponding to the bottoms of the secondary batteries 200. Further, the battery pack 100 includes: a PCM assembly 30 attached to a side of the sub-frame 300 to be electrically coupled with the secondary batteries; first and second main frames 10, 20 covering the sides of the sub-frame 300; and a covering member 40 substantially covering or enclosing the first and second main frame 10, 20 and the secondary batteries 200.

Further, referring to FIGS. 2 and 3, each of the secondary batteries includes an electrode assembly 210, a can 220, and a cap assembly 230. The electrode assembly 210 is formed by winding a first electrode plate, a second electrode plate, and separators.

As shown in FIG. 3, the first electrode plate and the second electrode plate of the electrode assembly 210 have first and second electrode leads 211, 212, respectively. The electrode assembly 210 is electrically coupled with external components by the first and second electrode leads 211, 212 attached to the electrode plates. Hereinafter, the first electrode plate is referred to as an anode plate, and the second electrode plate is referred to as a cathode plate, for the convenience of description.

As described above, the electrode assembly 210 is formed by winding an anode plate, a cathode plate, and separators interposed between the electrode plates. The electrode assembly 210 formed as described above is accommodated in the can 220, as shown in FIG. 3. Further, an electrolyte is also accommodated in the can 220, and the opening of the can is sealed with the cap assembly 230.

The cap assembly 230 includes a cap plate 231, a cathode pin 232, an electrolyte injection hole 233, and a safety vent 234 on the cap plate 231.

The cathode pin 232 is coupled to the second electrode lead 212 to function as a cathode terminal. Further, the first electrode lead 211 is spaced apart from the second electrode lead 212 and welded to the cap plate 231 to function as an anode terminal. Here, the first and second electrode leads 211, 212 may be attached to the electrode plates by resistance welding and/or laser welding.

The electrolyte injection hole 233 is formed at one side of the cap assembly 230. The electrolyte injection hole 233 is for injecting an electrolyte. After the cap assembly 230 is placed over the opening of the can 220, the electrolyte is injected through the electrolyte injection hole 233. Thereafter, the electrolyte injection hole 233 is sealed by a separate sealing member containing, e.g., aluminum. Further, it is possible to prevent outside air from entering into the electrolyte injection hole 233 by applying silicon on the separate sealing member. As described above, the electrolyte injection hole 233 applied with silicon may have a hemispherical shape.

Further, the safety vent 234 is formed at the other side of the cap assembly 230 to allow a gas to be discharged when the internal pressure of the secondary battery 200 increases above a set or predetermined pressure.

The can 220, for example, may be made of aluminum. Further, in one embodiment, the can 220 has a rectangular parallelepiped shape with the sides rounded. The can 220 has a bottom 223 opposite to the cap assembly 230. The sides of the can 220 have two wide sides 222 and two narrow sides 221 connecting the two wide sides 222, and the wide sides 222 and the narrow sides 221 face each other, respectively. In the can 220, the wide sides 222 and the narrow sides 221 are integrally provided with the bottom 223. The narrow sides 222 are shown to have rounded portions 221a in the figures. However, the shape of secondary batteries that can be accommodated in a battery pack according to the present invention is not limited to the rectangular parallelepiped shape described above.

Figure 4A:
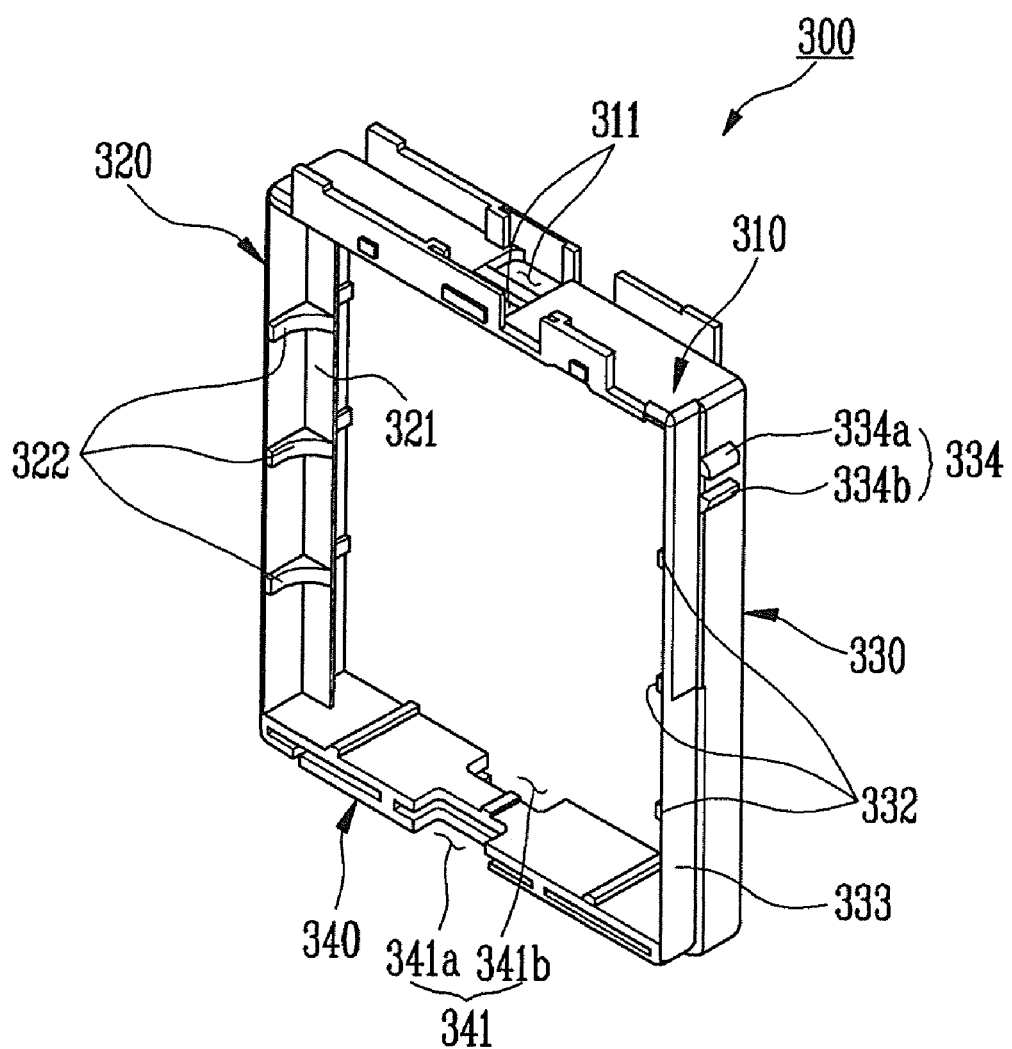
FIG. 4A is a perspective view of a sub-frame included in the battery pack shown in FIG. 1.
Figure 4B:
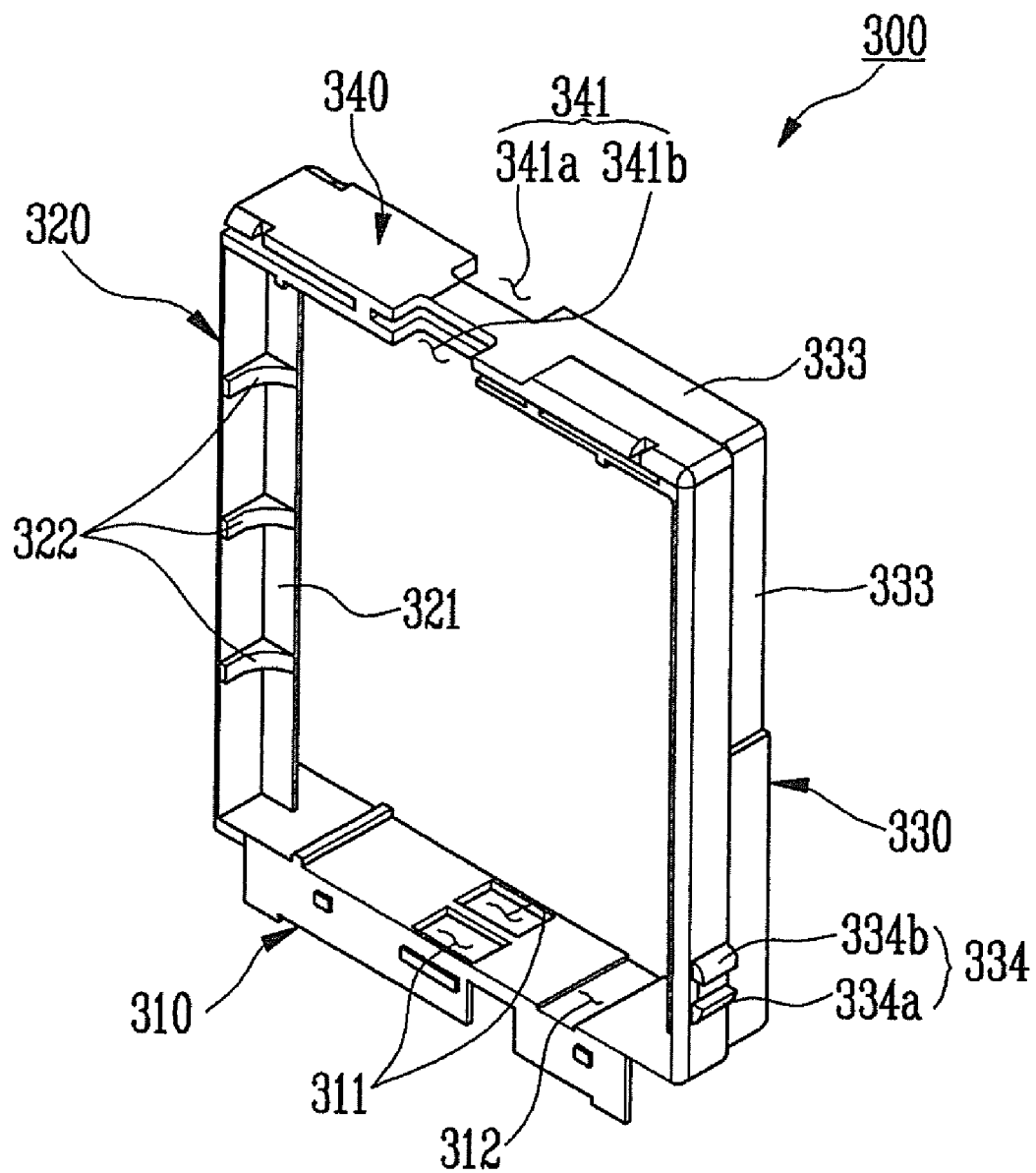
FIG. 4B is a perspective view of the sub-frame in FIG. 4A rotated at 180°.

FIG. 4A is a perspective view of a sub-frame according to one embodiment, and FIG. 4B is a perspective view of the sub-frame in FIG. 4A rotated at 180°.

Referring to FIGS. 4A and 4B, the sub-frame 300 has a top 310, a bottom 340 opposite to the top 310, and two sides 320, 330 extending from sides of the top 310 and the bottom 340. That is, as shown in the figures, the sub-frame 300 may be a rectangular parallelepiped with the opposite wide sides open.

First, the PCM assembly 30 (see FIG. 2) is mounted on the top 310 of the sub-frame 300. In FIG. 4A, the top 310 has two cathode pin holes 311. The cathode pins of the secondary batteries accommodated in the sub-frame 300 are exposed through the cathode pin holes 311. The cathode pins exposed through the cathode pin holes 311 are electrically coupled with the PCM assembly that is mounted on the top of the sub-frame 300 by electrode leads made of nickel, etc.

Referring to FIGS. 3 and 4B, the top 310 of the sub-frame 300 has an electrolyte injection hole guide 312 at one side on the inner surface. The guide 312 is recessed from (or lower than) the other potions of the inner surface. The guide 312 corresponds to the electrolyte injection hole 233 of the secondary battery 200 when the secondary battery 200 is accommodated inside the sub-frame 300. In one embodiment, silicon is applied to the electrolyte injection hole 233 of the secondary battery 200 to reinforce the sealing of the secondary battery 200. Accordingly, in one embodiment, the electrolyte injection hole 233 applied with silicon has a convex shape relatively to the other portions. The guide 312 is formed on the inner surface of the top 310 of the sub-frame 300 to correspond to the electrolyte injection hole 233 of the secondary battery 200. The guide 312 accommodates the increased height of the electrolyte injection hole 233 applied with silicon. As described above, the guide 312 aligns the secondary battery 200 and facilitates assembly of the secondary battery 200 and the sub-frame 300. Therefore, the secondary battery 200 is firmly accommodated inside the sub-frame 300.

Further, the sub-frame 300 has two sides 320, 330 extending from both ends of the top 310. Hereinafter, the side at the left in the figure is referred to as a first side 320, and the side at the right is referred to as a second side 330, for the convenience of description. However, this is for making it easy to explain the sub-frame 300, and the first and second sides 320, 330 may be exchanged to the left and right, such that it is not limited thereto. Further, the components and function of the first and second sides 320, 330 may be appropriately modified in accordance with the design of the battery pack 100 including the sub-frame 300.

First, the first side 320 has a flange 321 extending from the inner surface and fixing ribs 322.

The flange 321 protrudes from a center line of the inner surface of the first side 320. Further, the flange 321 is at the inner surface of one end portion of each of the top 310 and the bottom 340. That is, the flange 321 extends along a direction from one end portion of the top 310 to one end portion of the bottom 340 to contact the one end portion of the top 310 and the one end portion of the bottom 340, inside the sub-frame 300. The flange 321 functions as a rib supporting the inside of the sub-frame 300 and guiding two secondary batteries accommodated inside the sub-frame 300.

The fixing ribs 322 are in contact with the flange 321 and the inner surface of the first side 320 and extend perpendicularly from the flange 321 and the inner surface of the first side 320. The fixing ribs 322 are connected with the inner surface of the first side 320 and the flange 321, where the flange 321 is joined to the inner surface of the first side 320. Sides of the fixing ribs 322 facing the secondary battery 200 are rounded. The fixing ribs 322 contact the secondary battery 200 that is accommodated inside the sub-frame 300 and have a shape corresponding to the sides of the secondary battery 200. As shown in FIG. 3, the sides of the secondary battery 200 are substantially rounded. Therefore, the fixing ribs 322 are rounded to correspond to the sides of the secondary battery 200.

As described above, the fixing ribs 322 secure the secondary battery 200 accommodated inside the sub-frame 300. Therefore, the secondary battery 200 is not easily moved by an external shock, after being accommodated inside the sub-frame 300. Although there are three fixing ribs 322 spaced at a regular distance from each other in the figure, the number and position of the fixing ribs 322 are not limited thereto. That is, the fixing ribs 322 may be positioned at other suitable locations to prevent or protect the secondary battery 200 from moving inside the sub-frame 300.

The second side 330 is opposite to the first side 320 of the sub-frame 300. The second side 330 is also provided with a flange and fixing ribs 332. The flange and the fixing ribs 332 have the same configuration and function as the flange 321 and the fixing ribs 322 on the first side 320 described above. Further, although it is shown in the figure that the fixing ribs 332 are formed at the positions corresponding to the fixing ribs 322 on the first side 320, it is not limited thereto. As described above, the fixing ribs 332 may be at other suitable locations to fix the secondary battery 200 accommodated inside the sub-frame 300 to prevent or protect the secondary battery 200 from moving inside the sub-frame 300. In one embodiment, the flanges 321 and the fixing ribs 322, 332 are at the same positions on the first and second sides 320, 330, respectively, in order to reduce the manufacturing cost of the sub-frame 300.

The second side 330 further has a stepped portion 333. The second side 330 is basically the same as the first side 320 of the sub-frame, except for the stepped portion 333 formed on the outer surface. Further, although the stepped portion 333 of this embodiment is on the second side, that is, shown at the right of the sub-frame 300 in the figure, it is not limited thereto. The stepped portion 333 may be formed at the left of the sub-frame 300 or may be formed at both left and right of the sub-frame 300.

The stepped portion 333 extends on the second side 330. The stepped portion 333 is a portion where the electrode lead 32 of the PCM assembly 30 is seated. The electrode lead 32 electrically couples the PCM 31 with the secondary battery 200. The stepped portion 333, on the sub-frame 300, extends from the joint between the top 310 and the second side 330 to the bottom 340 of the sub-frame 300 along the second side 330. That is, the stepped portion 333 extends to an opening (e.g., notches) 341 formed at the bottom 340 of the sub-frame 300.

As shown in the figure, the stepped portion 333 is formed along the second side 330 at one end portion of the second side 330 to be lower than the other portions. That is, the stepped portion 333 has a thickness less than the other portions by as much as the thickness of the electrode lead 32 of the PCM assembly 30. Therefore, when the electrode lead 32 is seated in the stepped portion 333, the combined thickness of the electrode lead 32 and the stepped portion 333 is close to the thickness of the other portions.

Further, one or more locking protrusions 334 are formed on the outer surfaces of the first and second sides 320, 330 such that the sub-frame 300 may be combined with the first and second main frames 10, 20 shown in FIG. 2. The locking protrusions 334 are locked in locking grooves on the inner surface of the first and second main frames 10, 20 such that the sub-frame 300 and the first and second main frames 10, 20 are combined.

In more detail, the locking protrusions 334 have a first locking protrusion 334a and a second locking protrusion 334b. The first locking protrusion 334a is locked in the locking groove formed on the inner surface of the first main frame 10 and the second locking protrusion 334b is locked in the locking groove formed on the inner surface of the second main frame 20. Further, although only the locking protrusions 334 formed on the second side 330 are shown in FIGS. 4A and 4B, locking protrusions (not shown) having the same configuration and function may be formed on the outer surface of the first side 320. That is, the locking protrusions may also include first and second locking protrusions, and as described above, are locked in the locking grooves of the first and second main frames 10 and 20, respectively.

In some embodiments, the sub-frame 300 may be combined with the first and second main frames 10, 20 without the locking protrusions and locking grooves using a separate adhesive and/or a double-sided tape.

Further, the sub-frame 300 according to one embodiment as shown has a pair of notches 341a, 341b at the bottom 340. The notches 341a, 341b include a first notch 341a and a second notch 341b. The first notch 341a is extended from the stepped portion 333 at the bottom 340, and the second notch 341b is formed near the first notch 341a.

The first and second notches 341a, 341b expose a portion of each of the secondary batteries 200 accommodated inside the sub-frame 300. That is, a portion of the bottom 223 of each of the secondary batteries 200 shown in FIG. 3 is exposed to the outside through the first and second notches 341a, 341b. The portions of the bottoms 223 of the secondary batteries 200, which are exposed to the outside, are in contact with the electrode leads (or tabs) 32a, 32b of the PCM assembly 30, respectively. Therefore, the secondary batteries 200 are electrically coupled to the PCM assembly 30 through the electrode leads 32, 32a, 32b.

Figure 5:
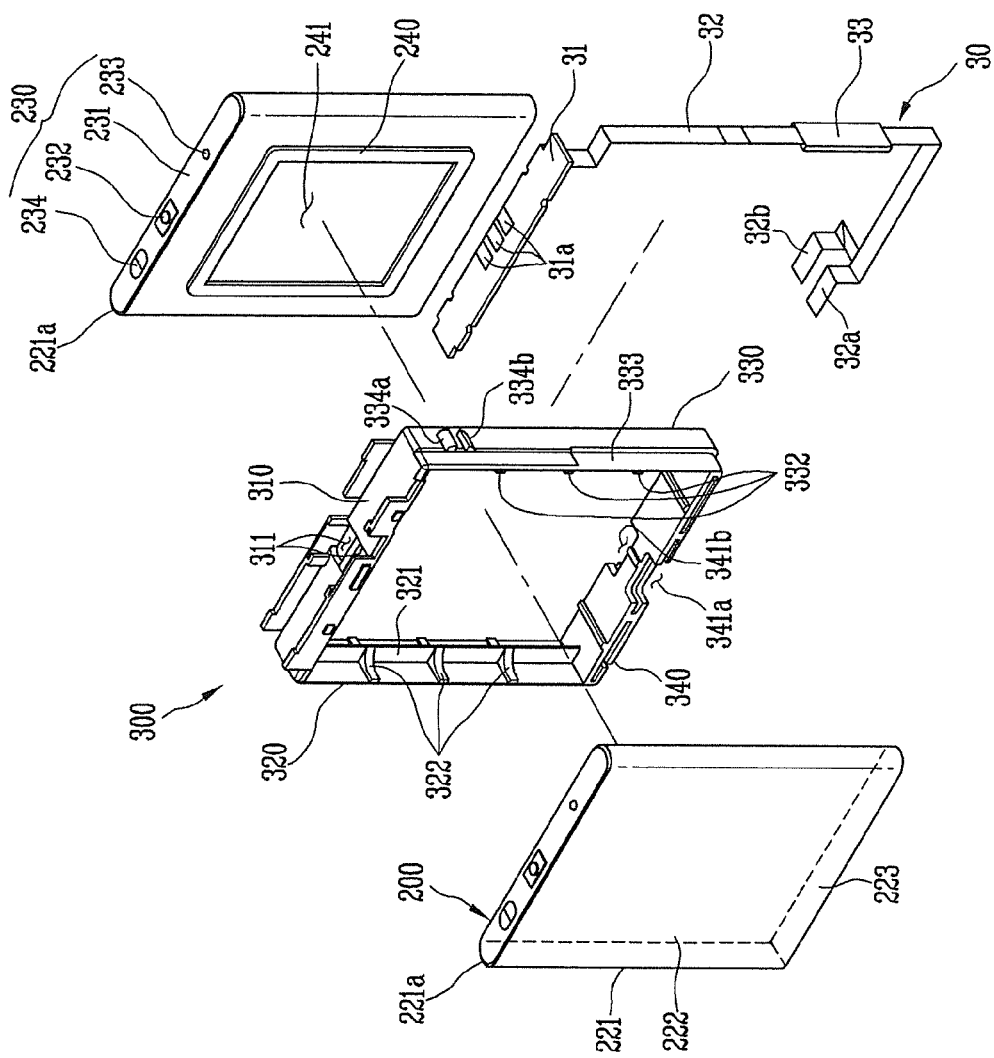
FIG. 5 is a perspective view illustrating that the secondary battery is accommodated in the sub-frame and schematically showing a PCM assembly.
Figure 6:
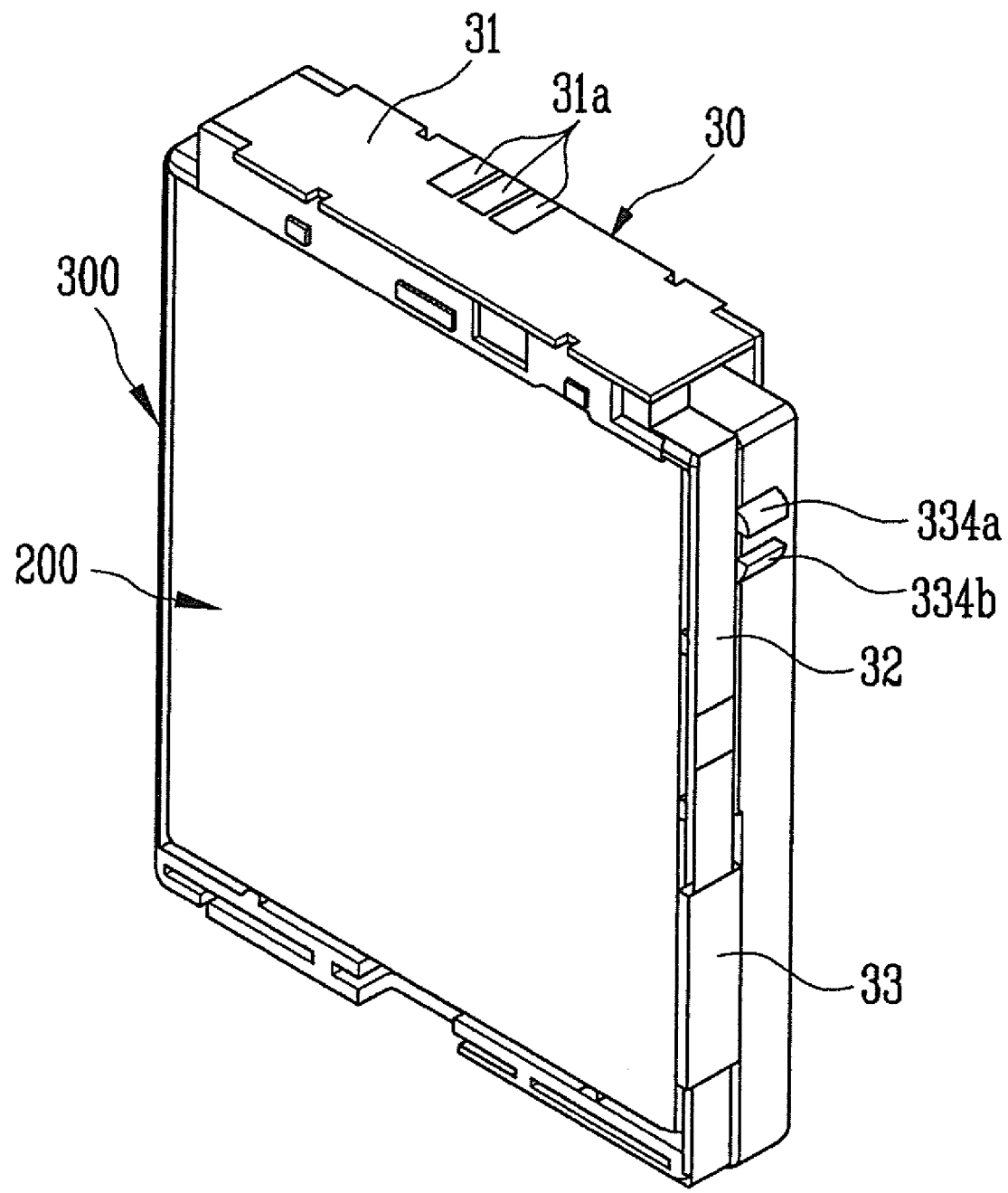
FIG. 6 is a perspective view of the sub-frame equipped with the secondary battery and the PCM assembly.

Referring to FIGS. 5 and 6, the connection structure of the sub-frame 300, the secondary batteries 200, and the PCM assembly 30 are described in more detail.

FIG. 5 is a perspective view illustrating that the two secondary batteries 200 are accommodated in the sub-frame 300 and schematically showing a PCM assembly 30, and FIG. 6 is a perspective view of the sub-frame 300 equipped with the secondary batteries 200 and the PCM assembly.

A method of accommodating the two secondary batteries 200 inside the sub-frame 300 is described with reference to FIGS. 5 and 6.

As described above, the battery pack according to one embodiment includes the sub-frame 300, the two secondary batteries 200 accommodated inside the sub-frame 300, and the PCM assembly 30 electrically coupled with the secondary batteries 200. The PCM assembly 30 includes the PCM 31 mounted on the top of the sub-frame 300 and the electrode lead 32 positioned on the side and bottom 340 of the sub-frame.

Further, an adhesive member 240 may be placed between the opposite wide sides 222 of the two secondary batteries 200. The adhesive member 240 may be, for example, a double-sided tape. The adhesive member 240 fixes the secondary batteries 200 together when the secondary batteries 200 are accommodated inside the sub-frame 300. Therefore, it becomes simple to accommodate the secondary batteries 200 inside the sub-frame 300. Further, the adhesive member 240 may have a hole 241 therein. The hole 241 may have a rectangular shape, but it is not limited thereto.

The electrode assembly 210 (see FIG. 3) of the secondary batteries 200 may be swelled when the secondary batteries 200 are charged or discharged. The swelled electrode assembly 210 increases the thickness of the secondary battery 200, particularly, the thickness of the center portion of the wide side 222 of the secondary battery 200. When the thickness of the secondary battery 200 increases, as described above, the hole 241 provides a space that can compensate for the increased thickness of the secondary battery 200. That is, bonding force is increased by interposing the adhesive member 240 between the secondary batteries 200 facing each other, and it is possible to firmly fix the secondary batteries 200 inside the sub-frame 300 by providing a space between the secondary batteries 200 facing each other, hence removing the swelling problem.

A method of accommodating the secondary batteries 200 inside the sub-frame 300 is described hereinafter.

First, the adhesive member 240 is attached to the wide side 222 of the secondary battery 200. Thereafter, the secondary battery 200 is accommodated in the sub-frame 300, with the adhesive member 240 facing the inside of the sub-frame 300. After one secondary battery 200 is accommodated inside the sub-frame 300, the adhesive member 240 may be attached to the secondary battery 200 already accommodated in the sub-frame 300 or the secondary battery 200 to be accommodated in the sub-frame 300. Referring to the secondary battery 200 accommodated as described above, the cap assembly 230 of the secondary battery 200 corresponds to the top 310 of the sub-frame 300, and the bottom 223 of the secondary battery 200 corresponds to the bottom 340 of the sub-frame 300. Further, referring to the cap assembly 230 of the secondary battery 200, the cathode pin 232 is exposed to the outside through the cathode pin hole 311 formed through the top 310 of the sub-frame 300. Further, a portion of the bottom 223 of the secondary battery 200 is exposed to the outside through the notches 341, 341a, 341b formed through the bottom 340 of the sub-frame 300.

The sides 221 of the secondary battery 200 respectively correspond to the first and second sides 320, 330 of the sub-frame 300. In one embodiment, the rounded narrow sides 221a of the secondary battery 200 correspond to the fixing ribs 322, 332 on the first and second sides 320, 330 of the sub-frame 300.

The other secondary battery 200 is accommodated inside the sub-frame 300 in a similar way, as described above. The other secondary battery 200 accommodated later is separated by the flanges 321 of the first and second sides 320, 330 of the sub-frame 300. Further, the cathode pin 232 and the bottom 223 of the other secondary battery 200 are exposed through the sub-frame 330, in a similar way as described above.

Further, referring to FIG. 5, the PCM assembly 30 includes the PCM 31 and the electrode lead 32. The PCM 31 is electrically coupled with the secondary battery 200 through the electrode lead 32. Therefore, when the secondary battery 200 is overcharged or overdischarged, it is possible to prevent or protect the secondary battery from being overcharged or overdischarged by controlling a switching element of the PCM 31.

The PCM 31 has external terminals 31a for electrically coupling with outside components. Further, the PCM assembly 30 has the electrode lead 32 extending from the PCM 31 to be coupled with the bottom 223 of the secondary battery 200. The ends 32a, 32b of the electrode lead 32 are separated and electrically coupled to the bottoms 223 of the two secondary batteries 200, respectively.

The PCM 31 is seated on the top 310 of the sub-frame 300. The electrode lead 32 of the PCM assembly 30 is seated on the stepped portion 333 of the second side 330 of the sub-frame 300. Therefore, the stepped portion 333 including the electrode lead 32 may be made flat with the same thickness as the other portions. Further, the electrode lead 32 extend to the notches 341a, 341b formed through the bottom 340 of the sub-frame 300, along the second side 330. Therefore, the electrode lead 32 is coupled to the bottom 223 of the secondary battery 200 through the notches 341a, 341b. The stepped portion 333 extends to the notches 341a, 341b of the bottom 340 of the sub-frame 300. Accordingly, in the bottom 340, similar to the second side 330 described above, the stepped portion 333 including the electrode lead 32 is made flat with the same thickness as the other portions.

The ends 32a, 32b of the electrode lead 32 are respectively coupled to the secondary batteries 200 through the two notches 341a, 341b formed through the bottom 340 of the sub-frame 300. Resistance welding and/or laser welding may be used to secure the contact between the electrode lead 32 and the bottoms 223 of the secondary batteries 200. As described above, since the electrode lead 32 is coupled to the secondary batteries 200 through the notches 341a, 341b of the bottom 340, via the second side 330 of the sub-frame 300, the combination of the electrode lead 32 and the secondary batteries 200 becomes more secure. Therefore, in the above described battery pack 100, the electrode lead 32 is less likely to separate from the secondary battery 200 due to an external shock, such as a drop of the battery pack.

The PCM assembly 30 may further include a Positive Temperature Coefficient (PTC) device 33 formed on the electrode lead 32. The PTC device 33 is a protective device that is electrically coupled between the PCM 31 and the secondary batteries 200 to protect the secondary batteries 200 by blocking current flow, when the secondary batteries 200 are overheated above a set or predetermined temperature. The PTC device 33 may be thicker than the electrode lead 32. Therefore, a portion of the stepped portion 333 for accommodating the PTC device 33 may be thinner than other portions of the stepped portion 333. Accordingly, it is possible to further improve the degree of flatness of the stepped portion 333 with the PCM assembly 30 installed therein.

Figure 7:
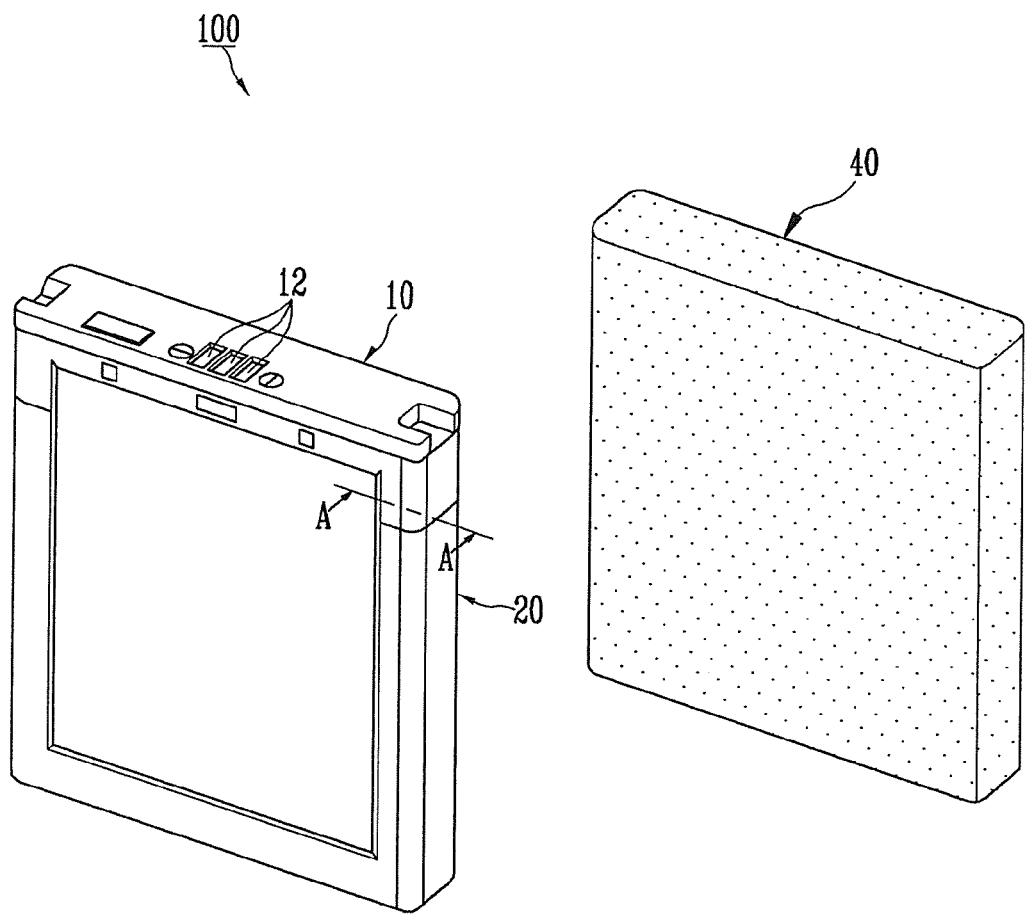
FIG. 7 is a perspective view of the sub-frame equipped with first and second main frame.
Figure 8:
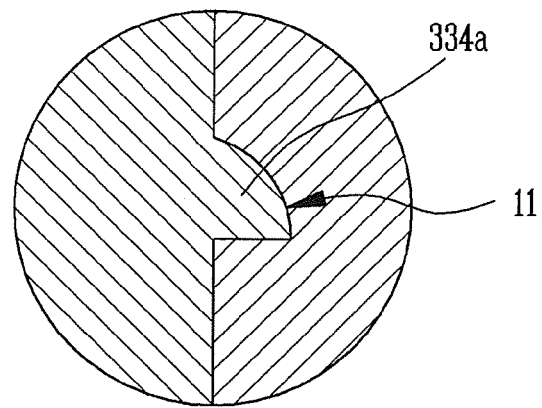
FIG. 8 is a cross-sectional view taken along the line A-A of FIG. 7.

FIG. 7 is a view showing the sub-frame 300 mounted in the first and second main frames 10, 20, and FIG. 8 is a cross-sectional view taken along the line A-A of FIG. 7.

As shown in FIG. 7, the first and second frames 10, 20 cover the outer surface of the sub-frame 300. The first main frame 10 has terminal holes 12 such that the external terminals 31a of the PCM assembly 30 shown in FIGS. 5 and 6 are exposed. The main frame 10 covers the top 310 and portions of the first and second sides 320, 330 of the sub-frame 300, and the second sub-frame 20 covers the bottom 340 and the other portions of the first and second sides 320, 330 of the sub-frame 300.

Referring to FIG. 8, locking grooves 11 are formed on the inner surface of the first and second main frame 10, 20. The locking grooves 11 are positioned to correspond to the locking protrusions 334a, 334b of the sub-frame 300 shown in FIG. 6 and locked to the locking protrusions. Referring to FIG. 8, the locking protrusion 334a is locked in the locking groove 11 on the inner surface of the first main frame 10, such that the sub-frame 300 is firmly combined with the main frame 10.

Further, a locking groove is also formed on the inner surface of the second main frame 20, corresponding to the position of the second locking protrusion 334b of the sub-frame 300 and locked to the second locking protrusion.

As described above, the battery pack 100 according to one embodiment is manufactured by combining the first and second main frames 10, 20 with the sub-frame 300 and then covering this assembly with the covering member 40.

The battery pack according to the exemplary embodiments of the present invention can be easily manufactured, even if the secondary batteries having different outer shapes, by partially changing the components of the sub-frame of the battery pack. In the battery pack according to the exemplary embodiments of the present invention, when the outer shapes of the secondary batteries of the battery pack are different from the embodiment described above, it is possible to change the components on the inner surface of the sub-frame to correspond to the outer shapes of the secondary batteries. That is, it is possible to change the components of the sub-frames without changing the PCM assembly and the first and second main frames, which cover the sub-frame. Therefore, it is possible to maintain the outer shape of the battery pack, regardless of the outer shapes of the secondary batteries accommodated in the battery pack. Further, since the battery pack according to the exemplary embodiments of the present invention can include various secondary batteries by changing a portion of the sub-frame, it is possible to improve process efficiency. Further, it is possible to easily change capacity of the secondary batteries accommodated in the battery pack, therefore, it is possible to achieve various capacities of the battery pack. In some embodiments, it is possible to change the outer shape of the sub-frame and modify the first and second main frames and the PCM assembly. This is described hereinafter in more detail with reference to another embodiment of the present invention.

Figure 9:
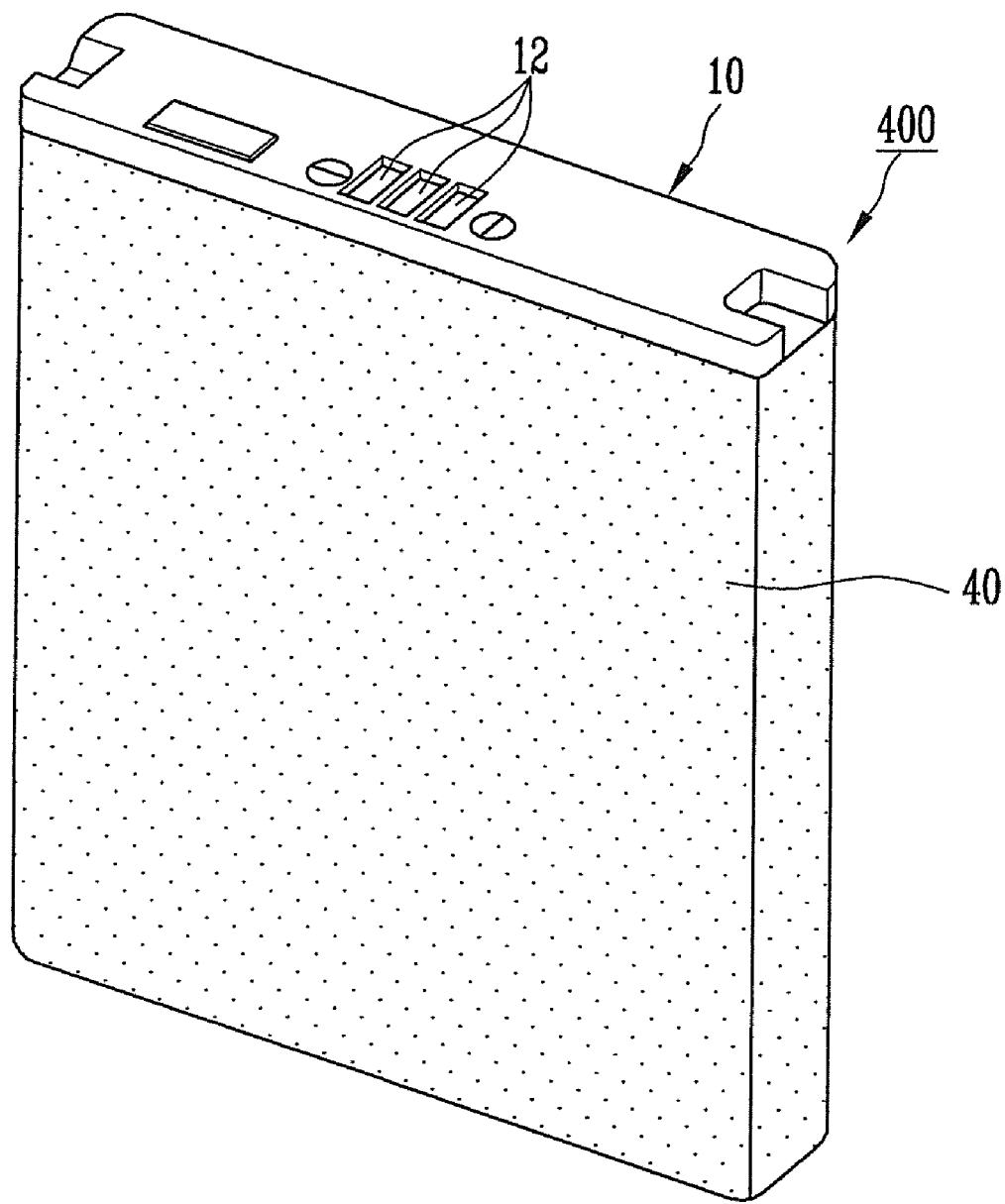
FIG. 9 is a perspective view showing a battery pack according to another embodiment of the present invention.
Figure 10:
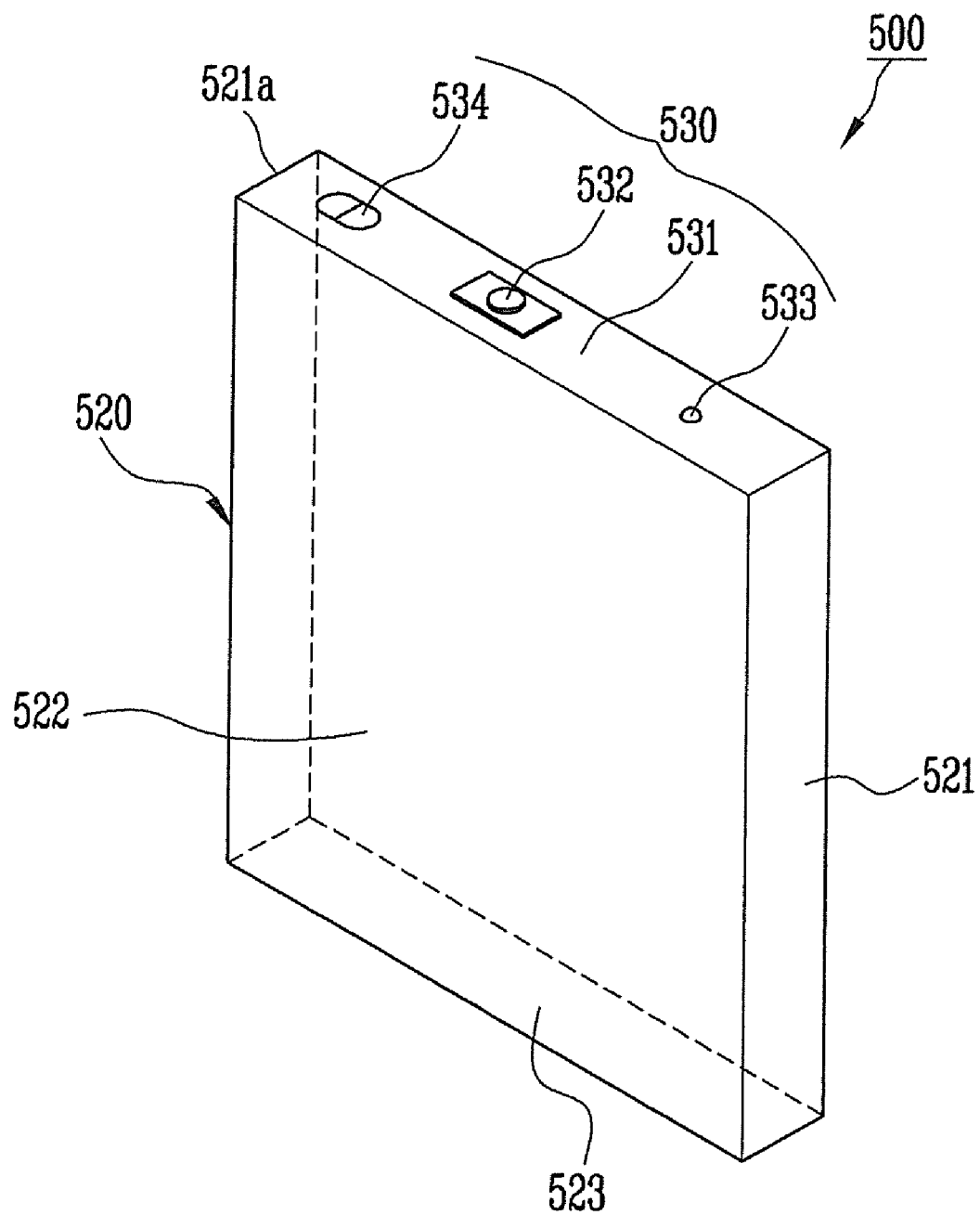
FIG. 10 is a perspective view of the secondary battery accommodated in the battery pack shown in FIG. 9.
Figure 11:
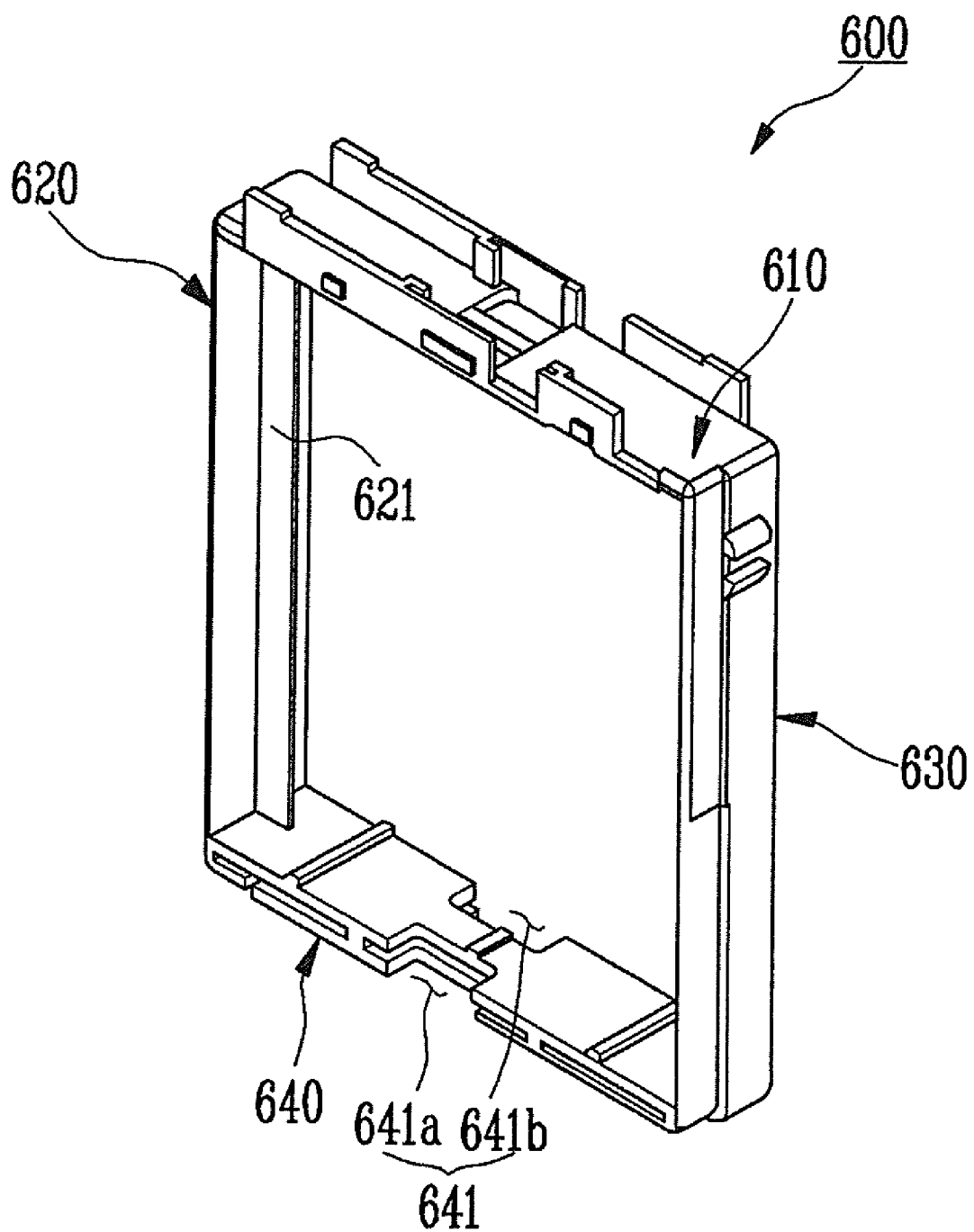
FIG. 11 is a perspective view of a sub-frame included in the battery pack shown in FIG. 9.

FIGS. 9 to 11 are views showing a battery pack 400 according to an embodiment of the present invention.

FIG. 9 is a perspective view of the battery pack 400 according to another embodiment of the present invention, and FIG. 10 is a perspective view of a secondary battery accommodated in the battery pack 400 shown in FIG. 9. FIG. 11 is a perspective view of a sub-frame 600 included in the battery pack 400 according to one embodiment.

Referring to FIGS. 9 and 11, the battery pack 400 according to one embodiment includes: a plurality of secondary batteries 500 and the rectangular sub-frame 600 surrounding the sides or peripheries of the secondary batteries 500 and having an opening 641 (e.g., notches) corresponding to the bottoms 523 of the secondary batteries 500. The battery pack 400 further includes: a PCM assembly attached to the top of the sub-frame 600 to be electrically coupled with the secondary batteries 500; first and second main frames 10, 20 covering the outer surface of the sub-frame 600; and a covering member 40 substantially covering the first and second main frame 10, 20 and portions of the secondary batteries 500.

The battery pack 400 is different from the embodiment of the battery pack 100, which was described above, in the configurations of the secondary batteries 500 and the sub-frame 600 accommodating the secondary batteries 500. On the other hand, the other configurations, for example, the first and second main frames 10, 20, the PCM assembly 30, and the covering member 40 have the same configurations and functions. The same configurations are indicated by the same reference numerals in the figures.

Referring to FIG. 10, the secondary battery 500 accommodated in the battery pack 400 has similar configuration and function as the secondary battery 200, but has a different outer shape. The narrow side 521 of the secondary battery 500 is substantially flat and is perpendicular to the wide side 522. In other words, the cap assembly 530 of the secondary battery 200 and the bottom 523 positioned to correspond to the cap assembly 530 are both formed in a rectangular shape. Therefore, the narrow side 521 of the secondary battery 500, which is in perpendicular contact with the cap assembly 530 and the bottom 523, has a substantially plane shape. That is, the secondary battery 500 is a rectangular parallelepiped having the flat narrow side 521.

FIG. 11 is a perspective view of the sub-frame 600 included in the battery pack 500 according to one embodiment.

Two secondary batteries 500 shown in FIG. 10 are accommodated in the sub-frame 600. The sub-frame 600 has a top 610, a bottom 640 formed opposite to the top 610, and two sides 620, 630 extending from the ends of the top 610 and bottom 640. That is, as shown in the figures, the sub-frame 600 may be a rectangular parallelepiped with two sides open.

First, the PCM 31 is mounted on the top 610 of the sub-frame 600, as similarly shown in FIG. 5. Further, the sub-frame 600 may have a cathode pin hole 311 and a guide 312, as shown in FIGS. 4A and 4B.

Further, the sub-frame 600 has two sides 620, 630 respectively extending from both ends of the top 610.

Flanges 621 are formed on both sides 620, 630. In this configuration, both sides 620, 630 may not have a fixing rib, different from the embodiment shown in FIGS. 4A and 4B.

The flange 621 reinforces and supports the inside of the sub-frame 600 and guiding the two secondary batteries 500 accommodated inside the sub-frame 600. Here, the secondary battery 500 according to the embodiment of FIG. 10 has rectangular sides. Therefore, the secondary battery 500 is in contact with the flange 621 of the sub-frame 600. That is, different from the embodiment of the battery pack 100, the side 521 of the secondary battery 500 has a shape corresponding to the flange 621. Therefore, the secondary battery 500 is firmly fixed to the inner surfaces of the sub-frame 600 by the flange 621, without a fixing rib.

The others features of the battery pack 500 are substantially the same as those described in the above embodiment of the battery pack 100.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack comprising:
   a first battery cell;
   a second battery cell;
   a frame accommodating the first and second battery cells; and
   a protective circuit module (PCM) assembly,
   wherein the battery cells each comprise a respective electrode terminal, and the frame comprises a hole, a location of the hole corresponding to a location of at least one of the electrode terminals,
   wherein the frame comprises at least one opening for allowing an electrode lead of the PCM assembly to make electrical contact with one of the battery cells, and the opening is located on an opposite side of the frame to the hole, and
   wherein the electrode lead of the PCM assembly firmly connects to the battery ells through the opening via a side of the frame.

2. The battery pack of claim 1, wherein the frame comprises at least one flange extending along at least one inner side of at least one side of the frame.

3. The battery pack of claim 2, wherein the frame further comprises a rib joining an inner surface thereof with a side of the at least one flange, the rib being shaped to conform to a surface of the first and second battery cells.

4. The battery pack of claim 1, further comprising an adhesive member fixing the first and second battery cells together within the frame.

5. The battery pack of claim 4, wherein the adhesive member comprises a double-sided tape.

6. The battery pack of claim 4, wherein the adhesive member comprises a peripheral portion surrounding an opening.

7. The battery pack of claim 1, wherein the frame comprises a step portion extending on an outside surface of at least a portion of at least one side of the frame.

8. The battery pack of claim 7, wherein the frame has at least one notch at a second side opposite to a first side having the at least one opening, and wherein the step portion extends to the at least one notch at an outside surface of the second side.

9. The battery pack of claim 8, further comprising a protective circuit module (PCM) assembly having at least a portion thereof on the step portion, the PCM assembly being electrically coupled to the battery cells by an electrode tab via the at least one notch.

10. The battery pack of claim 1, wherein the frame further comprises at least one locking protrusion on an outside surface of the frame.

11. The battery pack of claim 1, wherein the frame further comprises a guiding groove on an inner surface thereof, the guiding groove being located to correspond to an electrolyte injection hole of the first and second battery cells.

12. The battery pack of claim 11, further comprising a sealing material sealing the electrolyte injection hole of the first and second battery cells.

13. The battery pack of claim 1, wherein the frame is a single integral frame.

14. A battery pack comprising:
   at least first and second battery cells each having an electrode terminal;
   a frame surrounding a periphery of the first and second battery cells and having at least one opening corresponding to the electrode terminal of at least one of the first and second battery cells, wherein the frame further comprises at least one locking protrusion on an outside surface of the frame; and
   an outer frame receiving the frame and the first and second battery cells therein, the outer frame comprising at least one groove on an inner surface thereof for engaging the at least one locking protrusion of the frame.

15. The battery pack of claim 14, further comprising a cover substantially enclosing the outer frame.

* * * * *

UNITED STATES PATENT AND TRADEMARK OFFICE
CERTIFICATE OF CORRECTION

PATENT NO. : 8,343,651 B2
APPLICATION NO. : 13/010758
DATED : January 1, 2013
INVENTOR(S) : Kyung-Ho Park et al.

It is certified that error appears in the above-identified patent and that said Letters Patent is hereby corrected as shown below:

In the Claims

Column 11, Claim 1, line 26          Delete "ells"

Insert -- cells --

Signed and Sealed this
Twenty-seventh Day of May, 2014

Michelle K. Lee
*Deputy Director of the United States Patent and Trademark Office*